US006461542B1

(12) United States Patent
Smith et al.

(10) Patent No.: US 6,461,542 B1
(45) Date of Patent: Oct. 8, 2002

(54) FIRE RESISTANT GROUND COVER

(75) Inventors: Darold A. Smith; Anthony M. Hall, both of Springfield; Geri K. Brown, Portland, all of OR (US)

(73) Assignee: RoofGone, Inc., Springfield, OR (US)

( * ) Notice: Subject to any disclaimer, the term of this patent is extended or adjusted under 35 U.S.C. 154(b) by 0 days.

(21) Appl. No.: 09/565,232

(22) Filed: May 4, 2000

(51) Int. Cl.[7] ................................................ C09K 21/06
(52) U.S. Cl. ................. 252/601; 106/15.05; 106/18.11; 106/281.1; 106/282; 106/284.01; 252/607
(58) Field of Search ................................. 252/607, 601; 106/15.05, 18.11, 281.1, 282, 284.01

(56) References Cited

U.S. PATENT DOCUMENTS

| 3,313,636 A | 4/1967 | Blair et al. |
| 3,347,685 A | 10/1967 | Blalir et al. |
| 3,556,819 A | 1/1971 | Koons |
| 4,349,413 A | 9/1982 | Eklund |
| 4,659,381 A | 4/1987 | Walters |
| 4,925,494 A | 5/1990 | Hageman |
| 5,326,797 A | 7/1994 | Zimmerman et al. |
| 5,462,588 A | 10/1995 | Walters et al. |
| 5,582,759 A | 12/1996 | Bursey, Jr. |
| 5,658,972 A | 8/1997 | Grzybowski et al. |
| 5,975,801 A | * 11/1999 | Burns, Sr. et al. .......... 405/129 |

FOREIGN PATENT DOCUMENTS

| DE | 3104714 | * 3/1982 |
| GB | 2303639=8 | * 2/1997 |

* cited by examiner

*Primary Examiner*—Anthony J. Green
(74) *Attorney, Agent, or Firm*—Chernoff, Vilhauer, McClung & Stenzel, LLP

(57) ABSTRACT

A fire resistant composition comprises a quantity of cellulosic debris formed to be spread as a ground cover, and an asphalt-containing material mixed with the cellulosic debris. The asphalt-containing material comprises at least 35 wt % of the composition. Preferably, the asphalt-containing material is formed from asphalt roofing shingles. The cellulosic debris may be wood waste or other suitable materials formed into chips or other particles suitable for spreading as a ground cover. A method for forming a fire resistant composition comprised of cellulosic debris and an asphalt-containing material is also disclosed.

46 Claims, 1 Drawing Sheet

FIRE RESISTANT GROUND COVER

BACKGROUND OF THE INVENTION

The present invention relates to a fire resistant ground cover, and in particular to a ground cover composition comprised of cellulosic debris and an asphalt-containing material such as used asphalt roofing shingles.

The present invention finds its genesis in two seemingly unrelated problems. The first problem arises from the use of ground covers made from cellulosic debris such as wood chips or bark mulch. Such ground covers are one of the major sources for fires around buildings. They provide an excellent fuel source when dry. However, such ground covers are desired for a variety of reasons. Ground covers made from woody debris are aesthetically pleasing, control weeds, are easy to apply and maintain, and are relatively inexpensive. Nevertheless, every year such ground covers contribute to a substantial number of fires around buildings.

Some attempts have been made to prepare cellulosic material to make it fire retardant. Eklund, U.S. Pat. No. 4,349,413 discloses a thermal insulting material of cellulosic fibers prepared by treating the wood chips or other such material with saturated steam at elevated temperatures and pressures and then fiberizing the treated material. A fire-retardant material such as borax, boric acid or borate is added to the treated cellulosic material immediately prior to fiberization. The material may then be shredded and blown into walls and attics for use as insulation. Such material, however, is unsuited for use as a ground cover. The process is too expensive to provide sufficient quantities of ground cover, which is spread in large amounts around a building. Moreover, shredded fiberized material is unsuited for use as a ground cover, both for aesthetic reasons and because such a material would be prone to blowing off of the property.

Bursey, Jr., U.S. Pat. No. 5,582,759 discloses a fire extinguisher and retardant material formed from cellulosic mulch saturated with licorice juice. In order to increase the cohesiveness of the material, flexible strands of fine wire may be added to the mixture or a wire webbing may be used as a carrier material. The pulpy mass of wet material is applied to an area for use as a fire extinguisher or retardant material. Such a wet, pulpy, sticky material is unsuited for use as a ground cover.

Thus, what is still desired is a ground cover made from woody debris such as bark mulch or wood chips that is fire resistant, that is aesthetically pleasing, that is easy to maintain and apply, and that is inexpensive to prepare.

The second seemingly unrelated problem is the need to dispose of asphalt-containing materials, such as old asphalt roofing shingles. Roofing shingles must be periodically removed and replaced. However, even an average size home can yield in excess of 4 tons of asphalt shingles which must be disposed of. Presently, recycling of asphalt material is not available. Accordingly, the asphalt material must be disposed of in land fills as waste. Thus, disposing of the old roof represents a significant fraction of the cost associated with replacing a used roof. Similarly, other asphalt-containing materials must be disposed of as waste. What is desired is a method for recycling such used asphalt-containing materials.

BRIEF SUMMARY OF THE INVENTION

The present invention solves the two seemingly unrelated problems presented by the need for a fire retardant ground cover and a new use for asphalt-containing materials by providing a fire resistant composition. The composition contains a quantity of cellulosic debris formed to be spread as a ground cover, and an asphalt-containing material mixed with the cellulosic debris. The asphalt-containing material comprises at least 35% by volume of the composition. Preferably, the asphalt-containing material is formed from recycled asphalt roofing shingles. The cellulosic debris may be wood waste or other suitable materials formed into chips, particles, or mulch suitable for spreading as a ground cover.

Another aspect of the invention provides a method for forming a fire resistant composition. The method comprises the steps of: providing a quantity of cellulosic debris; forming the cellulosic debris into pieces capable of being spread as ground cover; providing an asphalt-containing material; forming the asphalt-containing material into pieces capable of being spread as ground cover; and mixing the asphalt-containing material with the cellulosic debris in a sufficient amount so that the asphalt-containing material comprises at least 35% by volume of the mixture.

In a related aspect of the invention, a method is provided for reducing the risk of fire around a building. After the fire retardant composition is formed, the resulting composition is spread as a ground cover around the building.

Surprisingly, compositions formed by combining cellulosic debris and asphalt-containing material solve the two problems discussed above. The compositions substantially reduce the risk of fire around a building. The compositions are not only fire resistant, but also extinguish fires that begin in the composition. The compositions also solve a major problem relating to disposal of two different types of waste, both cellulosic waste and used asphalt-containing material. The compositions, while providing superior fire resistance benefits, also are aesthetically pleasing and do not detract from the landscaping with which they are used. The compositions are also easy to make and apply.

The foregoing and other objectives, features, and advantages of the invention will be more readily understood upon consideration of the following detailed description of the invention.

DETAILED DESCRIPTION OF THE PREFERRED EMBODIMENTS

Figure 1:
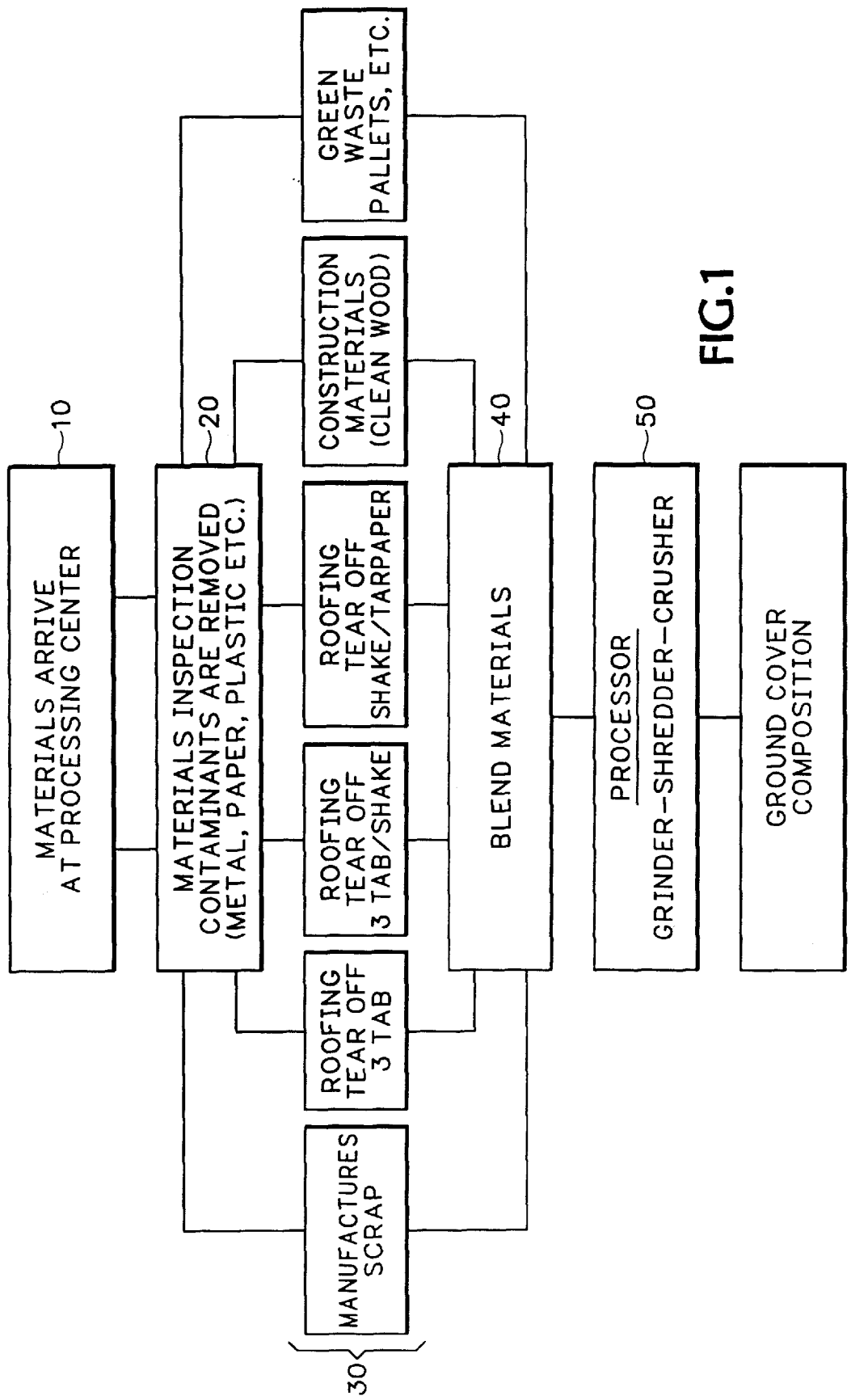
FIG. 1 is a flow chart of an exemplary process used to make the composition of the present invention.

The present invention provides a fire resistant composition that may be used as a ground cover. The essential ingredients of the composition are cellulosic debris and asphalt-containing material.

The cellulosic debris may be any type of cellulosic or wood containing material that may be used as a ground cover. Exemplary of such materials are wood chips, bark mulch, bark chips, etc. In addition to such conventional ground covers, the ground cover may be comprised of or supplemented with woody debris obtained from other sources. The woody debris should be free from contaminants such as asbestos, paint, preservatives, or other polluting and/or flammable material. One source of cellulosic material is post-consumer wood products such as cedar roofing shingles, construction debris, demolition debris, used lumber, old fences, crates, pallets, furniture, etc. Another source is waste material such as land clearing debris, brush, tree limbs, etc.

The cellulosic material is ground or chipped to an appropriate size so as to be capable of being spread as ground cover around a building. The size range for ground material may range from finely ground materials such as mulches to larger sized wood chips, which may be 2 to 3 inches in length. The particles should pass through a 2-inch screen (4 square inches in area), and preferably pass through a 1-inch screen (1 square inch in area). Grinding may be accomplished in any conventional fashion. Exemplary grinding equipment includes hammer mills (both vertical feed and horizontal feed), cutter head mill grinders, and knife edge grinders. Preferably, hammer mill and cutter head mills are preferred, and of these the hammer mill is most preferred. A hammer mill that may be used to grind the material used in the composition of the present invention is a 200 horsepower vertical-feed swing hammer mill manufactured by Schriber Machine of Springfield, Oreg.

The asphalt-containing material may be any material that contains asphalt or asphalt tar. A preferred material is post-consumer asphalt roofing material such as roofing shingles. Other materials include asphalt-impregnated felts or papers. Asphalt tar materials include asphalt tar chips, tar pot scraps, and keg asphalt tar. In addition to containing some form of asphalt, the asphalt-containing material should also be substantially solid at normal temperatures (e.g. below 110° F.), and the material must be capable of being ground or chipped to provide chips or pieces of material that pass through a 2-inch screen, and preferably pass through a 1-inch screen. Preferably, the asphalt-containing. material is ground to an average size of about 1 square inch.

The compositions of the present invention comprise the ground or chipped cellulosic material mixed with the ground or chipped asphalt-containing material. The asphalt-containing material may comprise from at least 35% to 70% of the mixture by volume, and preferably comprises from about 40% to about 60% of the mixture. It has been found that a composition containing at least 35% by volume of asphalt-containing material such as ground up asphalt roofing shingles exhibits superior fire retardant qualities. The asphalt-containing materials themselves are very fire resistant. Moreover, when a flame is applied to the composition, the flame causes the asphalt-containing material to melt. The melted asphalt-containing material acts as a fire extinguisher by flowing to cover the cellulosic material, thus extinguishing flames present in the cellulosic material and removing the cellulosic material as a fuel source. Thus, the present invention provides a surprisingly simple dry mixture that does not involve impregnating or coating the cellulosic debris yet achieves not only good fire resistance but also fire extinguishing properties.

Compositions of the present invention may be prepared in a variety of fashions. Referring to FIG. 1, cellulosic debris and asphalt-containing material is received at 10 and inspected at 20 for contaminants. Contaminated material is rejected. Foreign material such as metal, paper, plastic roof vents, wraps and other metallic or otherwise unsuitable material is removed by hand or in a sort line. The material is then placed in segregated storage areas at 30. The material may be segregated by type, for example, wood (such as shakes, plywood, etc.), wood shingles, wood shingle and asphalt mix, post-consumer asphalt roofing shingles, and asphalt manufacturing scrap. The cellulosic debris and asphalt-containing material are premixed at 40 using heavy machinery, such as a front end bucket loader. The premixed cellulosic debris and asphalt-containing material are then fed into a grinding machine at 50 for processing.

Alternatively, the cellulosic debris may be prepared separately by collecting the woody debris and then chipping or grinding the woody debris to size. The asphalt-containing material may also be separately collected and then ground to size. The cellulosic debris and asphalt-containing material may then be mixed together so as to yield a dry mixture containing the desired amount of asphalt-containing material. Preferably, the sizes of the particles are roughly the same for aesthetic reasons and for ease of mixing and applying.

The compositions may be used in any application in which conventional ground covers may be used. The compositions may be applied to the perimeter of buildings and used in any type of landscaping application. The compositions should be spread thickly enough and over a wide enough area to cover other materials that may otherwise become a fuel source. Preferably, the material is spread to a depth of at least 2 inches.

Other features and embodiments of the invention will become apparent from the following examples which are given for illustration of the invention rather than for limiting its intended scope.

EXAMPLE 1

The following example discloses a fire resistant ground cover comprised of wood scrap material and ground asphalt roofing shingles. First, equal amounts of asphalt roofing waste material and wood scrap material were measured and placed in respective 5 gallon containers. The materials were each then hand fed into a 5 horsepower hammer mill/chipper and discharged into a nylon bag for collection. The size of the resulting. ground particles ranged from ¼ to 1-½ square inches, together with fines. A 1-gallon mixture of Example 1 was prepared which contained 60% by volume ground asphalt-containing roofing material and 40% by volume ground wood scrap material.

Examples 2 and 3 were prepared in the same manner, except with the following compositions: Example 2, 50% asphalt/50% wood; Example 3, 40% asphalt/60% wood.

EXAMPLE 4

This example discloses a flammability test used to evaluate the ground cover compositions of Examples 1–3. The flammability tests were conducted according to the American Society of Testing and Materials (ASTM) test method F 1103: Materials Response to Flame. The procedure used to test Example 1 was as follows. The composition of Example 1 was conditioned at 70° F. and 50% relative humidity for 24 hours. A sample of Example 1 was then placed in a burn basket having a dimension of 9.5"×4.5"×1.5". The burn basket was suspended at a 45° angle and a flame was applied for two minutes. The flame was applied to the underside of the sample and at the center point. The flame was removed and the flame time, glow time, and flame penetration was recorded. The identical test was repeated for Examples 2–3. Table 1 shows the results of the flammability tests.

TABLE 1

| Example | Flame Time (sec.) | Glow Time (sec) | Flame Penetration |
| --- | --- | --- | --- |
| 1 | 0 | 42 | none |
| 2 | 0 | 53 | none |
| 3 | 0 | 20 | none |

The testing according to ASTM F 1103 found that each of Examples 1–3 were self-extinguishing. Although individual wood chips ignited and sustained combustion, multiple chips grouped together could not sustain combustion.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fire resistant composition comprising:
   (a) a quantity of cellulosic debris comprising ground wood, said cellulosic debris being sized to pass through a 2-inch screen; and
   (b) an asphalt-containing material mixed with said cellulosic debris and comprising at least 35% by volume of said composition, said asphalt containing-material comprising ground asphalt roofing material, and said asphalt-containing material being sized to pass through a 2-inch screen.

2. The composition of claim 1 wherein said cellulosic debris is selected from the group consisting of wood chips, bark chips and mulch.

3. The composition of claim 1 wherein said cellulosic debris contains ground wood waste.

4. The composition of claim 3 wherein said ground wood waste is selected from the group consisting of ground construction debris, lumber, fences, wood roofing shingles, crates, pallets, furniture, brush and tree limbs.

5. The composition of claim 1 wherein said cellulosic debris is ground to produce particles having an average particle size of less than 1.5 square inches.

6. The composition of claim 1 wherein said asphalt-containing material comprises post-consumer products selected from the group consisting of asphalt roofing shingles, tar paper, and tar-impregnated fabric.

7. The composition of claim 6 wherein said asphalt-containing material is asphalt roofing shingles.

8. The composition of claim 7 wherein said asphalt roofing shingles are ground to have a size of less than about one square inch in area.

9. The composition of claim 2 wherein said asphalt-containing material comprises asphalt roofing shingles ground to have a size of less than about one square inch in area.

10. The composition of claim 1 wherein said asphalt-containing material contains a material selected from the group consisting of asphalt tar chips, tar pot scraps and keg asphalt tar.

11. The composition of claim 1 wherein said asphalt-containing material comprises at least 40% by volume of said composition.

12. The composition of claim 1 wherein said asphalt-containing material comprises at least 50% by volume of said composition.

13. A method for forming a fire resistant composition comprising:
   (a) providing a quantity of cellulosic debris comprising wood;
   (b) forming said cellulosic debris into cellulosic particles sized to pass through a 2-inch screen;
   (c) providing an asphalt-containing material comprising asphalt roofing material;
   (d) forming said asphalt-containing material into asphalt-containing particles sized to pass through a 2-inch screen; and
   (e) mixing said asphalt-containing material with said cellulosic debris in a sufficient amount so that said asphalt-containing material comprises at least 35% by volume of said composition; wherein said steps (b) and (d) are performed separately from said step (e).

14. The method of claim 13 wherein said step of forming said cellulosic debris into cellulosic particles comprises grinding wood waste.

15. The method of claim 14 wherein said wood waste is selected from the group consisting of construction debris, wood roofing shingles, lumber, crates, pallets, furniture, brush and tree limbs.

16. The method of claim 13 wherein said cellulosic debris is ground to produce particles having an average particle size of less than 1.5 square inches.

17. The method of claim 13 wherein said step of forming said asphalt-containing material into asphalt-containing particles comprises grinding a post-consumer asphalt product selected from the group consisting of asphalt roofing shingles, tar paper, and tar-impregnated fabric.

18. The method of claim 17 wherein said asphalt-containing material is asphalt roofing shingles.

19. The method of claim 18 wherein said asphalt roofing shingles are ground to have a size of less than about one square inch in area.

20. The method of claim 13 wherein said asphalt-containing material comprises at least 40% by volume of said composition.

21. The method of claim 13 wherein said asphalt-containing material comprises at least 50% by volume of said composition.

22. A method for reducing the risk of fire around a building, comprising:
   (a) providing a quantity of cellulosic debris comprising wood;
   (b) forming said cellulosic debris into pieces sized to pass through a 2-inch screen;
   (c) providing an asphalt-containing material comprising asphalt roofing material;
   (d) forming said asphalt-containing material into pieces sized to pass through a 2-inch screen;
   (e) mixing said asphalt-containing material with said cellulosic debris to form a composition, said asphalt-containing material comprising at least 35% by volume of said composition; and
   (f) spreading said composition around said building as a ground cover; wherein said steps (b) and (d) are performed separately from said step (e).

23. The method of claim 22 wherein said step of forming said cellulosic debris into cellulosic particles comprises grinding wood waste.

24. The method of claim 23 wherein said wood waste is selected from the group consisting of construction debris, wood roofing shingles, lumber, crates, pallets, furniture, brush and tree limbs.

25. The method of claim 22 wherein said cellulosic debris is ground to produce particles having an average particle size of less than 1.5 square inches.

26. The method of claim 13 wherein said step of forming said asphalt-containing material into asphalt-containing particles comprises grinding a post-consumer asphalt product selected from the group consisting of asphalt roofing shingles, tar paper, and tar-impregnated fabric.

27. The method of claim 26 wherein said asphalt-containing material is asphalt roofing shingles.

28. The method of claim 22 wherein said asphalt roofing shingles are ground to have a size of less than about one square inch in area.

29. A method for forming a fire resistant composition comprising:
  (a) providing a quantity of cellulosic debris comprising wood;
  (b) forming said cellulosic debris into cellulosic particles sized to pass through a 2-inch screen;
  (c) providing an asphalt-containing material comprising asphalt roofing material;
  (d) forming said asphalt-containing material into asphalt-containing particles sized to pass through a 2-inch screen; and
  (e) mixing said asphalt-containing material with said cellulosic debris in a sufficient amount so that said asphalt-containing material comprises at least 35% by volume of said composition; wherein said steps (b) and (d) are performed at the same time as said step (e).

30. The method of claim 29 wherein said step of forming said cellulosic debris into cellulosic particles comprises grinding wood waste.

31. The method of claim 30 wherein said wood waste is selected from the group consisting of construction debris, wood roofing shingles, lumber, crates, pallets, furniture, brush and tree limbs.

32. The method of claim 29 wherein said cellulosic debris is ground to produce particles having an average size of less than 1.5 square inches.

33. The method of claim 29 wherein said step of forming said asphalt-containing material into asphalt-containing particles comprises grinding a post-consumer asphalt product selected from the group consisting of asphalt roofing shingles, tar paper, and tar-impregnated fabric.

34. The method of claim 33 wherein said asphalt-containing material is asphalt roofing shingles.

35. The method of claim 34 wherein said asphalt roofing shingles are ground to have a size of less than about one square inch in area.

36. The method of claim 29 wherein said asphalt-containing material comprises at least 40% by volume of said composition.

37. The method of claim 29 wherein said asphalt-containing material comprises at least 50% by volume of said composition.

38. A method for reducing the risk of fire around a building, comprising:
  (a) providing a quantity of cellulosic debris comprising wood;
  (b) forming said cellulosic debris into pieces sized to pass through a 2-inch screen;
  (c) providing an asphalt-containing material comprising asphalt roofing material;
  (d) forming said asphalt-containing material into pieces sized to pass through a 2-inch screen;
  (e) mixing said asphalt-containing material with said cellulosic debris to form a composition, said asphalt-containing material comprising at least 35% by volume of said composition; and
  (f) spreading said composition around said building as a ground cover; wherein said steps (b) and (d) are performed at the same time as step (e).

39. The method of claim 38 wherein said step of forming said cellulosic debris into cellulosic particles comprises grinding wood waste.

40. The method of claim 39 wherein said wood waste is selected from the group consisting of construction debris, wood roofing shingles, lumber, crates, pallets, furniture, brush and tree limbs.

41. The method of claim 38 wherein said cellulosic debris is ground to produce particles having an average size of less than 1.5 square inches.

42. The method of claim 38 wherein said step of forming said asphalt-containing material into asphalt-containing particles comprises grinding a post-consumer asphalt product selected from the group consisting of asphalt roofing shingles, tar paper, and tar-impregnated fabric.

43. The method of claim 38 wherein said asphalt-containing material is asphalt roofing shingles.

44. The method of claim 43 wherein said asphalt roofing shingles are ground to have a size of less than about one square inch in area.

45. The method of claim 38 wherein said asphalt-containing material comprises at least 40% by volume of said composition.

46. The method of claim 38 wherein said asphalt-containing material comprises at least 50% by volume of said composition.

* * * * *